US012517997B2

(12) United States Patent
Ahmed et al.

(10) Patent No.: US 12,517,997 B2
(45) Date of Patent: Jan. 6, 2026

(54) VALIDATION FOR AN IHS WITH SWAPPABLE HARDWARE COMPONENTS

(71) Applicant: Dell Products, L.P., Round Rock, TX (US)

(72) Inventors: A Anis Ahmed, Bangalore (IN); Jason Matthew Young, Round Rock, TX (US); Pallavi Satpathy, Bhubaneswar (IN); Kalyani Korubilli, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 125 days.

(21) Appl. No.: 18/509,616

(22) Filed: Nov. 15, 2023

(65) Prior Publication Data
US 2025/0156519 A1    May 15, 2025

(51) Int. Cl.
*G06F 21/44*    (2013.01)

(52) U.S. Cl.
CPC .................................. *G06F 21/44* (2013.01)

(58) Field of Classification Search
USPC ........................................................... 726/18
See application file for complete search history.

(56) References Cited

U.S. PATENT DOCUMENTS

| | | | | |
|---|---|---|---|---|
| 9,544,294 | B2* | 1/2017 | Srinivasan | H04L 63/102 |
| 10,311,224 | B1* | 6/2019 | Farhan | H04L 9/0897 |
| 10,489,339 | B2* | 11/2019 | Srivastava | G06F 13/4291 |
| 11,810,062 | B2* | 11/2023 | Young | G06F 21/57 |
| 11,836,544 | B2* | 12/2023 | Sayyed | G06F 9/4411 |
| 11,838,113 | B2* | 12/2023 | Munoz | G06F 9/30036 |
| 12,206,798 | B2* | 1/2025 | Savage | G06Q 10/087 |
| 12,229,241 | B2* | 2/2025 | Young | H04L 9/3268 |
| 2005/0086468 | A1* | 4/2005 | Meandzija | H04L 63/0428 |
| | | | | 713/156 |
| 2016/0078213 | A1* | 3/2016 | Rooyakkers | G06F 21/44 |
| | | | | 726/19 |
| 2019/0018966 | A1* | 1/2019 | Khatri | G06F 21/575 |
| 2022/0004640 | A1* | 1/2022 | Jacobs | G06F 9/445 |
| 2022/0067139 | A1* | 3/2022 | Rodriguez Bravo | |
| | | | | G06F 9/4406 |
| 2022/0385483 | A1* | 12/2022 | Tschofenig | H04L 9/0877 |
| 2022/0391235 | A1* | 12/2022 | Ghetie | G06F 9/45504 |
| 2023/0126538 | A1* | 4/2023 | Savage | H04L 9/3263 |
| | | | | 713/175 |
| 2023/0127882 | A1* | 4/2023 | Young | H04L 9/3234 |
| | | | | 713/156 |

\* cited by examiner

*Primary Examiner* — Sargon N Nano
(74) *Attorney, Agent, or Firm* — Fogarty LLP

(57) ABSTRACT

Systems and methods are provided for supporting secure swapping of replaceable hardware components of IHSs (Information Handling Systems). During factory provisioning of an IHS, a factory-signed inventory certificate is uploaded to the IHS that identifies factory-installed hardware of the IHS. Factory provisioning also generates a ledger certificate that identifies replaceable hardware of the IHS that may occasionally be swapped from the IHS. Upon receipt of the IHS by the administrator, validation procedures use the inventory certificate to validate the detected IHS hardware as factory-installed. When discrepancies are identified in the detected hardware, the ledger certificate is retrieved and consulted to determine whether the discrepancy is due to movement of swappable hardware. The ledger certificate is then updated for use in validating the movement of the replaceable hardware.

20 Claims, 9 Drawing Sheets

400

VALIDATION FOR AN IHS WITH SWAPPABLE HARDWARE COMPONENTS

FIELD

The present disclosure relates generally to Information Handling Systems (IHSs), and relates more particularly to supporting secure modifications to IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some types of IHSs, such as mobile phones and tablets, are typically manufactured in large quantities and with few variations. For instance, for a particular model of mobile phone or tablet, hundreds of thousands of identical, or nearly identical, devices may be manufactured. Other types of IHSs, such as rack-mounted servers, are manufactured in much smaller quantities and are frequently manufactured and customized according to specifications provided by a specific customer that has contracted for the manufacture and delivery of the server. In such instances, a customer may specify various hardware and/or software customizations that configure the server to support specific functionality. For example, a customer may contract for manufacture and delivery of a server that includes security adaptations that will enable the server to quickly and securely process artificial intelligence computations. Once an IHS has been received and deployed, a customer may make modifications to the hardware and software of the IHS in order to adapt it for a particular computing task or a particular physical environment. In some scenarios, such as within a data center, rack-mounted server IHSs may include replaceable hardware components that are easily removed from the IHS and replaced, in some instances while the operations of the IHS continue.

SUMMARY

In various embodiments, methods and systems include an IHS (Information Handling System) that includes: one or more processors; one or more memory devices coupled to the processors, the memory devices storing computer-readable instructions that, upon execution by the processors, cause a validation process of the IHS to: retrieve a factory-provisioned inventory certificate that specifies factory-installed hardware of the IHS; identify a discrepancy between detected hardware of the IHS and the factory-installed hardware specified in the factory-provisioned inventory certificate; retrieve a factory-provisioned ledger certificate that specifies replaceable hardware supported by the IHS; determine when the discrepancy is due to movement of the replaceable hardware supported by the IHS; upon validating the movement of the replaceable hardware, update the ledger certificate to indicate the movement of the replaceable hardware supported by the IHS.

In some embodiments, updates to the ledger certificates are blocked until the factory-provisioned inventory certificate is used to confirm the IHS was received including only the factory-installed hardware. In some embodiments, updates to the ledger certificates are blocked by a remote access controller of the IHS. In some embodiments, the factory-provisioned inventory certificate is stored to a persistent memory of the IHS during the factory-provisioning of the IHS. In some embodiments, the factory-provisioned ledger certificate is also stored to the persistent memory of the IHS during the factory-provisioning of the IHS. In some embodiments, the replaceable hardware specified in the ledger certificate comprises hardware not included in a hardware root-of-trust of the IHS. In some embodiments, hardware included in the hardware root-of-trust of the IHS comprises at least one of a processor, remote access controller and TPM (Trusted Platform Module). In some embodiments, validation of a modification specified in the ledger certificate does not require validating any prior modifications to the IHS. In some embodiments, updates to the ledger certificate specify whether a replaceable hardware component of the IHS is installed in the IHS. In some embodiments, the ledger certificate specifies all replaceable hardware components of the IHS that are installed in the IHS. In some embodiments, updates to the ledger certificate specify whether a replaceable hardware component of the IHS is not installed in the IHS. In some embodiments, the ledger certificate specifies a plurality of replaceable hardware components of the IHS that have been authorized for use by the IHS, but are not installed in the IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
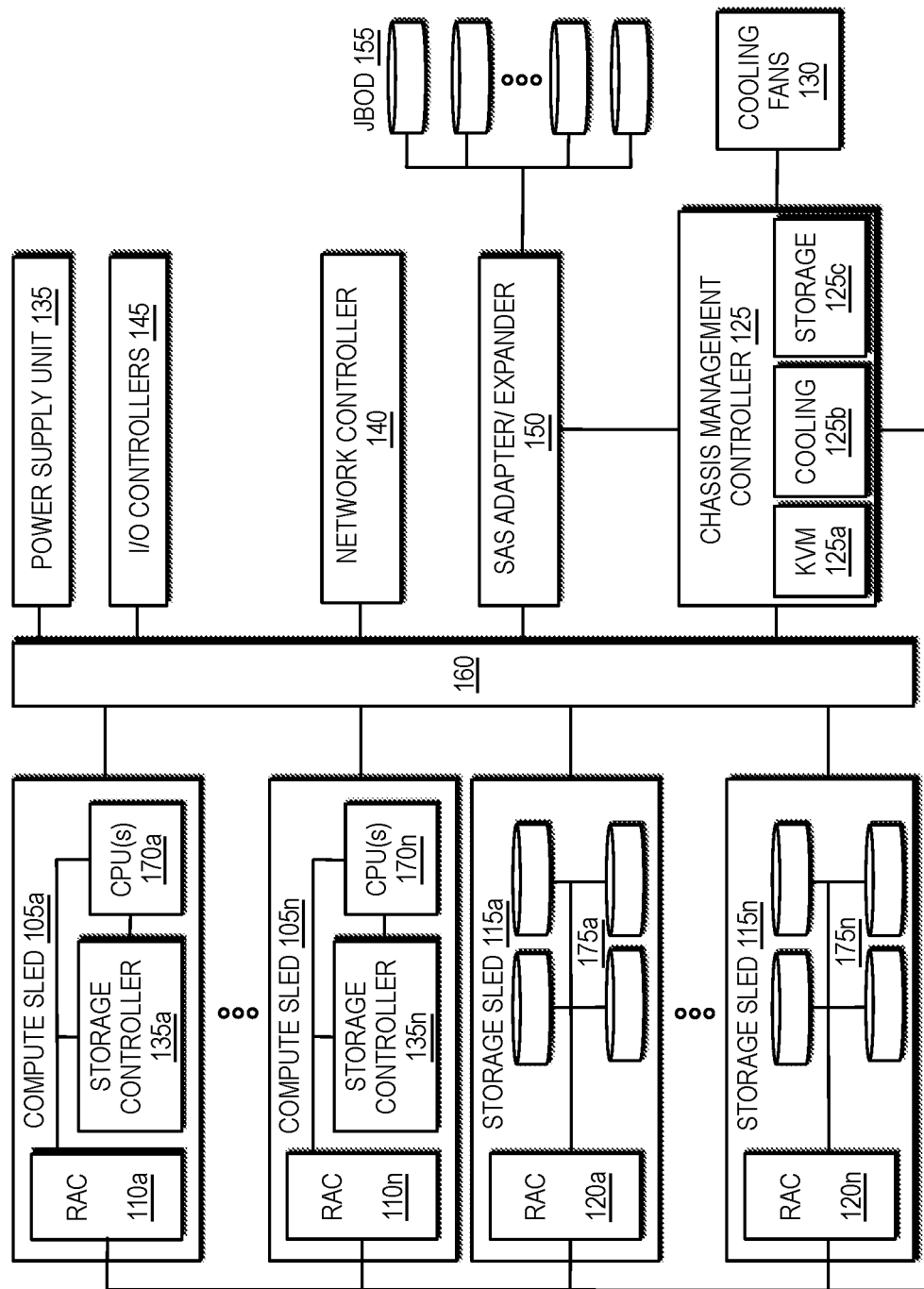
FIG. 1 is a diagram illustrating certain components of a chassis, according to some embodiments, for supporting secure swapping of replaceable hardware components of the chassis.

FIG. 1 is a block diagram illustrating certain components of a chassis 100 comprising one or more compute sleds 105a-n and one or more storage sleds 115a-n that may be configured to implement the systems and methods described herein for supporting secure swapping of replaceable hardware components of the chassis 100. Embodiments of chassis 100 may include a wide variety of different hardware configurations. Such variations in hardware configuration may result from chassis 100 being factory assembled to include components specified by a customer that has contracted for manufacture and delivery of chassis 100. Upon delivery of an chassis 100, the chassis and/or individual IHS sleds installed in the chassis 100, may be modified by replacing various hardware components or by installing new hardware components.

As described in additional detail below, chassis 100 may include capabilities that allow a customer to validate that hardware detected in chassis 100 is the same factory installed and provisioned hardware that was supplied to the customer. The validations of the hardware components that are detected by a chassis 100 may be conducted based a factory-provisioned inventory certificate that identifies the factory-installed hardware of an IHS. Once a chassis 100 is in operation, administration of chassis 100 may include various hardware modifications, such as to support the requirements of a specific deployment or to replace faulty or outdated components. In some instances, these administrative operations may include adding or removing replaceable hardware components of chassis 100. Various replaceable hardware components may be supported by chassis 100, where these replaceable hardware components may be repeatedly added and removed from chassis 100 by administrators. As described in additional detail below, embodiments support secure modifications involving replaceable hardware components of chassis 100 through the use of a ledger certificate that is used for tracking and validating such modifications.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135. In some embodiments, a backplane 160 may be uniquely identified based on a code or other identifier that may be permanently encoded in a non-volatile memory of the backplane 160 by its manufacturer. As described below, embodiments may support validation of backplane 160 as being the same backplane that was installed at the factory during the manufacture of chassis 100.

Figure 2:
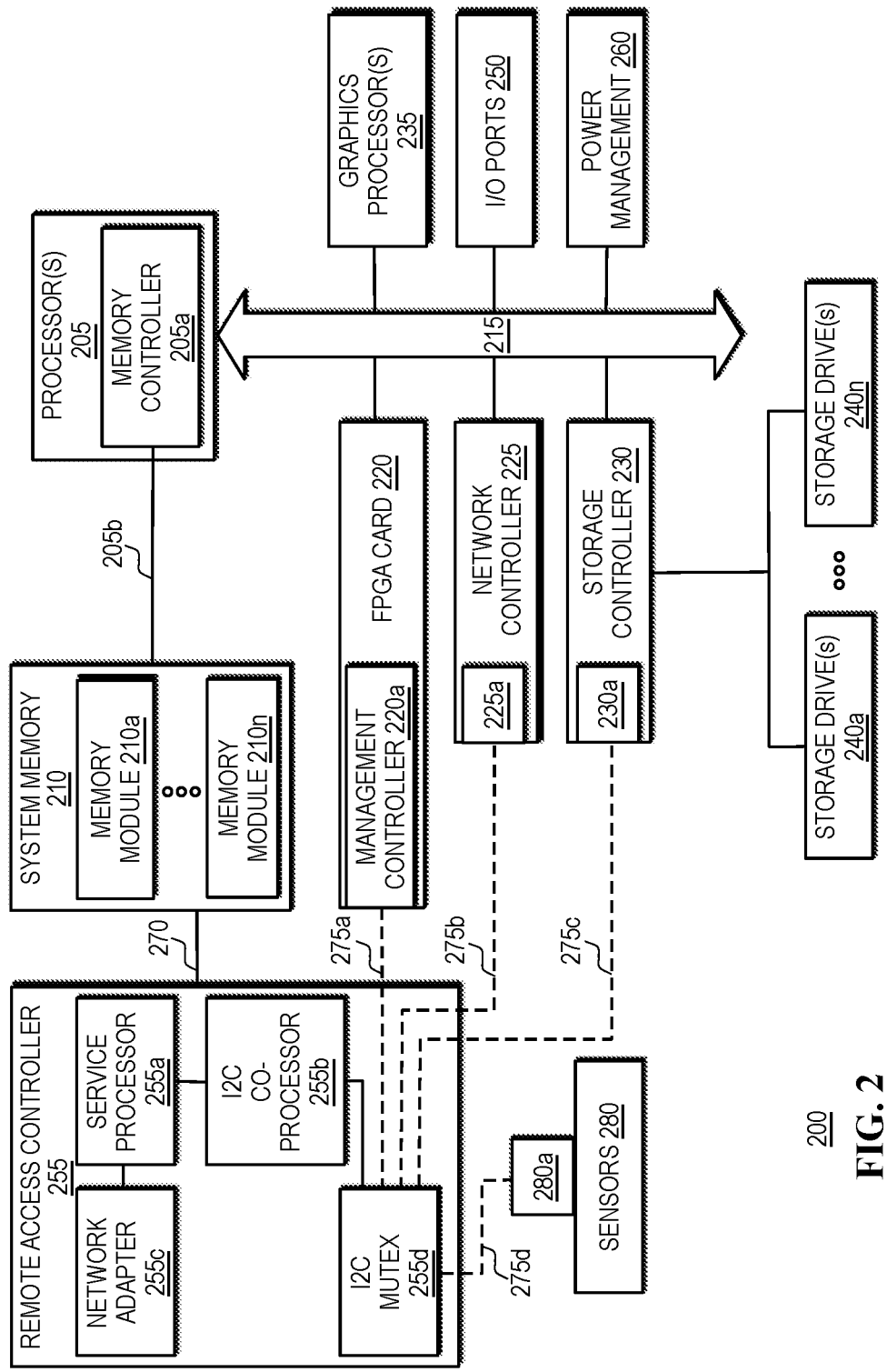
FIG. 2 is a diagram illustrating certain components of an IHS configured, according to some embodiments, for supporting secure swapping of replaceable hardware components of the IHS.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controllers 110a-n may collect various types of sensor data, such as collecting temperature sensor readings that are used in support of airflow cooling of the chassis 100 and the sleds 105a-n, 115a-n. In addition, each remote access controller 110a-n may implement various monitoring and administrative functions related to compute sleds 105a-n that utilize sideband bus connections with various internal components of the respective compute sleds 105a-n.

Each of the compute sleds 105a-n may include a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located. In some embodiments, a SAS expander 150 and storage drive 155 may be uniquely identified based on a code or other identifier that may be permanently encoded in a non-volatile memory of the SAS expander 150 or storage drive 155 by its respective manufacturer. In instances where SAS expander 150 and storage drives 155 are factory installed, as described below, embodiments may support validation of SAS expander 150 and storage drives 155 as being the same SAS expander and storage drives that were installed at the factory during the manufacture of chassis 100.

Storage drives 155 may be a replaceable hardware component of chassis 100, where an administrator may be able to swap storage drives 155 installed in dedicated bays of chassis 100. In some embodiments, these storage drives 155 may be designated during factory-provisioning as replaceable hardware components of chassis 100. In some configurations, some or all of the IHSs (e.g., compute sleds 105a-n and storage sleds 115a-n) installed in chassis 100 may have access to these replaceable storage drives 155. As described in additional detail below, embodiments may further support secure validation of addition or removal of individual replaceable storage drives 155 through factory-provisioned ledger certificates that are maintained by each of the IHSs installed in the chassis 100, where each ledger certificate may record all validated installation and removal of replaceable storage drives 155 that have been authorized for use in chassis 100, thus supporting swapping of these replaceable components in a secure manner.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100. As illustrated, each storage sled 115a-n includes a remote access controller (RAC) 120a-n provides capabilities for remote monitoring and management of respective storage sleds 115a-n. In some embodiments, each storage sled 115a-n may be uniquely identified based on a code or other identifier that may be permanently encoded in a non-volatile memory of the respective storage sled 115a-n by its manufacturer. As described below, embodiments support validation of each storage sled 115a-n as being a storage sled that was installed at the factory during the manufacture of chassis 100.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. In some embodiments, a network controller 140 may be uniquely identified based on a code or other identifier that may be permanently encoded in a non-volatile memory of the network controller 140 by its manufacturer. As described below, embodiments support validation of network controller 140 as being the same network controller that was installed at the factory during the manufacture of chassis 100. In some embodiments, network controller 140 may be a replaceable hardware component of chassis 100, where an administrator may be able to swap network controllers installed in dedicated networking bays of chassis 100. As described in additional detail below, embodiments may further support secure validation of the addition and removal of individual network controllers 140 of chassis 100 through factory-provisioned ledger certificates that are maintained by each of the IHSs installed in the chassis 100, where each ledger certificate may record all validated instances of installation and removal of the replaceable network controllers 140 that have been authorized for use in the chassis 100.

Chassis 100 may similarly include one or more power supply units 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with multiple redundant, hot-swappable power supply units. In some embodiments, a power supply unit 135 may be uniquely identified based on a code or other identifier that may be permanently encoded in a non-volatile memory of the power supply unit 135 by its manufacturer. As described below, embodiments support validation of power supply unit 135 as being the same power supply unit that was installed at the factory during the manufacture of chassis 100.

In some embodiments, power supply unit 135 may be a replaceable hardware component of chassis 100, where an administrator may be able to swap power supply units 135 installed in dedicated power bays of chassis 100. As described in additional detail below, embodiments may further support secure validation of addition or removal of individual power supply units 135 of chassis 100 through factory-provisioned ledger certificates that are maintained by each of the IHSs installed in the chassis 100, where each ledger certificate may record all validated instances of installation and removal of the replaceable power supply units 135 that have been authorized for use in the chassis 100.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. In some embodiments, each I/O controller 140 may be uniquely identified based on a code or other identifier that may be permanently encoded in a non-volatile memory of the respective I/O controller 140 by its manufacturer. As described below, embodiments support validation of I/O controllers 140 as being the same I/O controllers that were installed at the factory during the manufacture of chassis 100. As described in additional detail below, embodiments may further support secure validation of the replacement, removal or addition of an I/O controller 140.

The chassis management controller 125 may also include a storage module 125c that provides capabilities for managing and configuring certain aspects of the storage devices of chassis 100, such as the storage devices provided within storage sleds 115a-n and within the JBOD 155. In some embodiments, a chassis management controller 125 may be uniquely identified based on a code or other identifier that may be permanently encoded in a non-volatile memory of the chassis management controller 125 by its manufacturer. As described below, embodiments support validation of chassis management controller 125 as being the same chassis management controller that was installed at the factory during the manufacture of chassis 100.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting secure swapping of replaceable hardware components of the IHS 200. It should be appreciated that although the embodiments described herein may describe an IHS that is a compute sled or similar computing component that may be deployed within the bays of a chassis, other embodiments may be utilized with other types of IHSs that may also support validation of the secure assembly and delivery of the IHS 200, and further support secure and reversible modifications to hardware components the IHS 200. In the illustrative embodiment of FIG. 2, IHS 200 may be a computing component, such as compute sled 105a-n or other type of server, such as an 1RU server installed within a 2RU chassis, that is configured to share infrastructure resources provided by a chassis 100. In some instances, shared infrastructure resources of chassis 100 may be implemented using replaceable hardware components of the chassis 100 that are accessible by IHS 200.

As described, an IHS 200 may be assembled and provisioned according to customized specifications provided by a customer. The IHS 200 of FIG. 2 may be a compute sled, such as compute sleds 105a-n of FIG. 1, that may be installed within a chassis, that may in turn be installed within a rack. Installed in this manner, IHS 200 may utilize shared power, network and cooling resources provided by the chassis and/or rack. Embodiments of IHS 200 may include a wide variety of different hardware configurations. Such variations in hardware configuration may result from IHS 200 being factory assembled to include components specified by a customer that has contracted for manufacture and delivery of IHS 200. As described in additional detail below, IHS 200 may include capabilities that allow a customer to validate that the hardware components of IHS 200 are the same hardware components that were installed at the factory during its manufacture, where these validations of the IHS hardware may be initially completed using a factory-provisioned inventory certificate.

In addition, embodiments support secure modifications to IHS 200, such as by an administrator that adds or removes replaceable hardware components that are supported by IHS 200, where these replaceable hardware components may be repeatedly added and removed from IHS 200 by administrators. Embodiments support secure modifications involving replaceable hardware components of IHS 200 through the use of a ledger certificate that is generated during factory provisioning of the IHS 200 and updated to reflect the current installed and validated status of individual replaceable hardware components that have been authorized for use by the IHS, where the ledger certificate can be used in the ongoing validation of the replaceable hardware components of the IHS.

IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications. In some embodiments, each of the processors 205 may be uniquely identified based on a code or other identifier that may be permanently encoded in a respective processor 205 by its manufacturer. As described below, embodiments support validation of processors 205 as being the same processors that were installed at the factory during the manufacture of IHS 200.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b. The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory. In some embodiments, each of the memory modules 210a-n may be uniquely identified based on a code or other identifier that may be permanently encoded in a respective memory module 210a-n by its manufacturer. As described below, embodiments support validation of memory modules 210a-n as being the same memory modules that were installed at the factory during the manufacture of IHS 200. In some embodiments, memory modules 210a-n may be designated during factory provisioning of IHS 200 as replaceable hardware components of the IHS. Accordingly, as described in additional detail below, embodiments may further support secure validation of the replacement, removal or addition of replaceable memory modules 210a-n from IHS 200 through updates to the factory-provisioned ledger certificate of the IHS, where the ledger certificate records all validated instances of installation and removal of the individual memory modules 210a-n that have been authorized for use in the chassis 100.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources and/or other peripheral components.

As illustrated, IHS 200 may include one or more FPGA (Field-Programmable Gate Array) cards 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of such logic units, each individual FGPA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220a that may support interoperation with the remote access controller 255 via a sideband device management bus 275a. In some embodiments, each of the FPGA cards 220 installed in IHS 200 may be uniquely identified based on a code or other identifier that may be permanently encoded in the FPGA card 220 by its manufacturer. As described below, embodiments support validation of FPGA card 220 as being the same FPGA card that was installed at the factory during the manufacture of IHS 200.

Processor(s) 205 may also be coupled to a network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. In some embodiments, network controller 225 may be an integrated component of IHS 200. In some embodiments, network controller 225 may be uniquely identified based on a code or other identifier, such as a MAC address, that may be permanently encoded in a non-volatile memory of network controller 225 by its manufacturer. As described below, embodiments support validation of network controller 225 as being the same network controller that was installed at the factory during the manufacture of IHS 200. In some embodiments, network controller 225 may be designated during factory provisioning of IHS 200 as a replaceable hardware component of the IHS. Accordingly, as described in additional detail below, embodiments may further support secure validation of the replacement, removal or addition of network controller 225 from IHS 200 through updates to the factory-provisioned ledger certificate of the IHS, where the ledger certificate records all validated instances of installation and removal of the individual network controllers that have been authorized for use in the chassis 100.

IHS 200 may include one or more storage controllers 230 that may be utilized to access storage drives 240a-n that are accessible via the chassis in which IHS 100 is installed. Storage controller 230 may provide support for RAID (Redundant Array of Independent Disks) configurations of logical and physical storage drives 240*a-n*. In some embodiments, storage controller 230 may be an HBA (Host Bus Adapter) that provide more limited capabilities in accessing physical storage drives 240*a-n*. In some embodiments, storage drives 240*a-n* may be replaceable, hot-swappable storage devices that are installed within bays provided by the chassis in which IHS 200 is installed. In embodiments where storage drives 240*a-n* are hot-swappable devices that are received by bays of chassis, the storage drives 240*a-n* may be coupled to IHS 200 via couplings between the bays of the chassis and a midplane of IHS 200. In some embodiments storage drives 240*a-n* may also be accessed by other IHSs that are also installed within the same chassis as IHS 100. Storage drives 240*a-n* may include SAS (Serial Attached SCSI) magnetic disk drives, SATA (Serial Advanced Technology Attachment) magnetic disk drives, solid-state drives (SSDs) and other types of storage drives in various combinations.

As described below, embodiments support validation of storage drives 240*a-n* as being the same storage drives installed at the factory during the manufacture of IHS 200. In some embodiments, each individual storage controller 230 and storage drive 240*a-n* may be uniquely identified based on a code or other identifier that may be permanently encoded in a non-volatile memory of the component by its manufacturer. As described below. Embodiments support validation of storage controller 230 and storage drives 240*a-n* as being the same storage controller and storage drives that were installed at the factory during the manufacture of IHS 200. In some embodiments, some or all of storage drives 240*a-n* may be designated during factory provisioning of IHS 200 as replaceable hardware components of the IHS. Accordingly, as described in additional detail below, embodiments may further support secure validation of the replacement, removal or addition of storage drives 240*a-n* from IHS 200 through updates to the factory-provisioned ledger certificate of the IHS, where the ledger certificate records all validated instances of installation and removal of the individual storage drives 240*a-n* that have been authorized for use in the chassis 100.

A variety of additional components may be coupled to processor(s) 205 via in-band bus 215. For instance, processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255. In some embodiments, components such as power management unit 260 and graphics processor 235 may also be uniquely identified based on a code or other identifier that may be permanently encoded in a non-volatile memory of these components by their respective manufacturer. As described below, embodiments support validation of these components as being components that were installed at the factory during the manufacture of IHS 200.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255. As described in additional detail below, in some embodiments, BIOS may be configured to identify hardware components that are detected as being currently installed in IHS 200. In such instances, the BIOS may support queries that provide the described unique identifiers that have been associated with each of these detected hardware components by their respective manufacturers.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 255 that supports remote management of IHS 200 and of various internal components of IHS 200. In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the operating system of IHS 200 (i.e., in a bare-metal state). In some embodiments, certain operations of the remote access controller 225, such as the described inventory certificate generation and validation operations, may operate using validated instructions, and thus within the root of trust of IHS 200.

In some embodiments, remote access controller 255 may be uniquely identified based on a code or other identifier that may be permanently encoded in a non-volatile memory of the remote access controller 255 by its manufacturer. As described below, embodiments support validation of remote access controller 255 as being the same controller that was installed at the factory during the manufacture of IHS 200.

Also as described below, during a provisioning phase of the factory assembly of IHS 200, a signed certificate that specifies factory installed hardware components of IHS 200 that were installed during manufacture of the IHS 200 may be stored in a non-volatile memory that is accessed by remote access controller 255. Using this signed inventory certificate stored by the remote access controller 255, a customer may validate that the detected hardware components of IHS 200 are the same hardware components that were installed at the factory during manufacture of IHS 200.

Also as described below, in another aspect of the provisioning phase of the factory assembly of IHS 200, an additional signed certificate, referred to herein as a 'ledger certificate,' that specifies replaceable hardware components of IHS 200 may also be stored in the non-volatile memory that is accessed by remote access controller 255. Using this ledger certificate stored by the remote access controller 255, all validated modifications that add or remove replaceable hardware components from the IHS 200 are tracked in the ledger certificate such that it reflects the installation status of all replaceable hardware components that have been authorized for installation in the IHS.

In support of the capabilities for validating the detected hardware components of IHS 200 against the inventory information that is specified in a signed inventory certificate or in a ledger certificate, remote access controller 255 may support various cryptographic capabilities. For instance, remote access controller 255 may include capabilities for key generation such that remote access controller may generate keypairs that include a public key and a corresponding private key. As described in additional detail below, using generated keypairs, remote access controller 255 may digitally sign inventory information collected during the factory assembly of IHS 200 such that the integrity of this signed inventory information may be validated at a later time using the public key by a customer that has purchased IHS 200. Using these cryptographic capabilities of the remote access controller, the factory installed inventory information that is included in an inventory certificate and a ledger certificate may be anchored to a specific remote access controller 255, since the keypair used to sign the inventory information is signed using the private key that is generated and maintained by the remote access controller 255.

In some embodiment, the cryptographic capabilities of remote access controller 255 may also include safeguards for encrypting any private keys that are generated by the remote access controller and further anchoring them to components within the root of trust of IHS 200. For instance, a remote access controller 255 may include capabilities for accessing hardware root key (HRK) capabilities of IHS 200, such as for encrypting the private key of the keypair generated by the remote access controller. In some embodiments, the HRK may include a root key that is programmed into a fuse bank, or other immutable memory such as one-time programmable registers, during factory provisioning of IHS 200. The root key may be provided by a factory certificate authority, such as described below. By encrypting a private key using the hardware root key of IHS 200, the hardware inventory information that is signed using this private key is further anchored to the root of trust of IHS 200. If a root of trust cannot be established through validation of the remote access controller cryptographic functions that are used to access the hardware root key, the private key used to sign inventory information cannot be retrieved. In some embodiments, the private key that is encrypted by the remote access controller using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMG, the encrypted private key can only be retrieved by a component within the root of trust of IHS 200, such as the remote access controller 255.

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of an I2C multiplexer 255d of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275a-d used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement sideband I2C communications between the remote access controller 255 and managed components 220, 225, 230, 280 of the IHS. The I2C co-processor 255b may be a specialized co-processor or microcontroller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a which may be referred to as modular field replaceable units (FRUs).

As illustrated, the I2C co-processor 255b may interface with the individual managed devices 220, 225, 230, 280 via individual sideband I2C buses 275a-d selected through the operation of an I2C multiplexer 255d. Via switching operations by the I2C multiplexer 255d, a sideband bus connection 275a-d may be established by a direct coupling between the I2C co-processor 255b and an individual managed device 220, 225, 230, 280. In providing sideband management capabilities, the I2C co-processor 255b may each interoperate with corresponding endpoint I2C controllers 220a, 225a, 230a, 280a that implement the I2C communications of the respective managed devices 220, 225, 230.

The endpoint I2C controllers 220a, 225a, 230a, 280a may be implemented as a dedicated microcontroller for communicating sideband I2C messages with the remote access controller 255, or endpoint I2C controllers 220a, 225a, 230a, 280a may be integrated SoC functions of a processor of the respective managed device endpoints 220, 225, 230, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
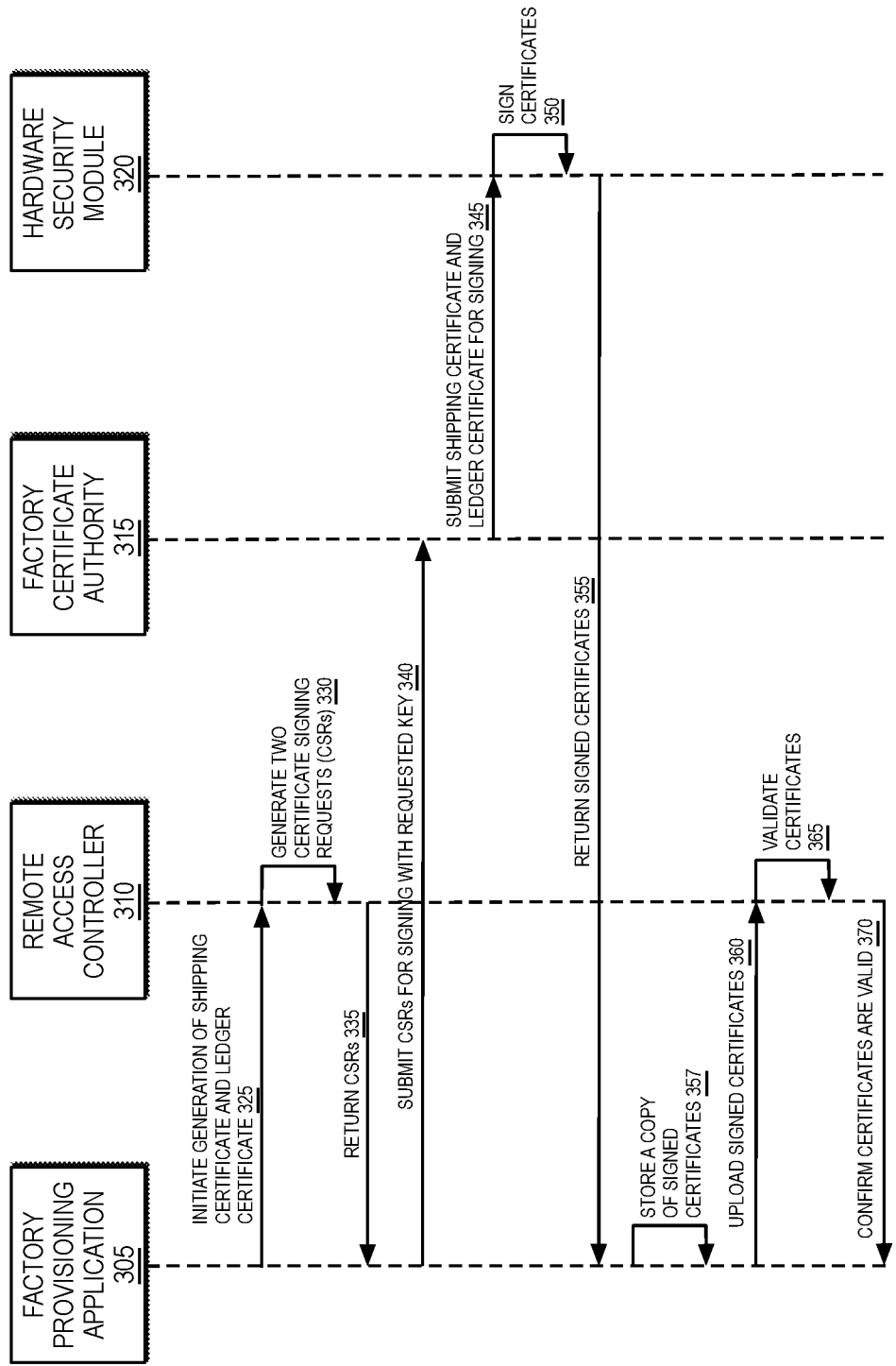
FIG. 3 is a swim lane diagram illustrating certain responsibilities of components of a system configured according to certain embodiments for factory provisioning of an IHS in a manner that supports secure swapping of replaceable hardware components of the IHS.
Figure 4A:
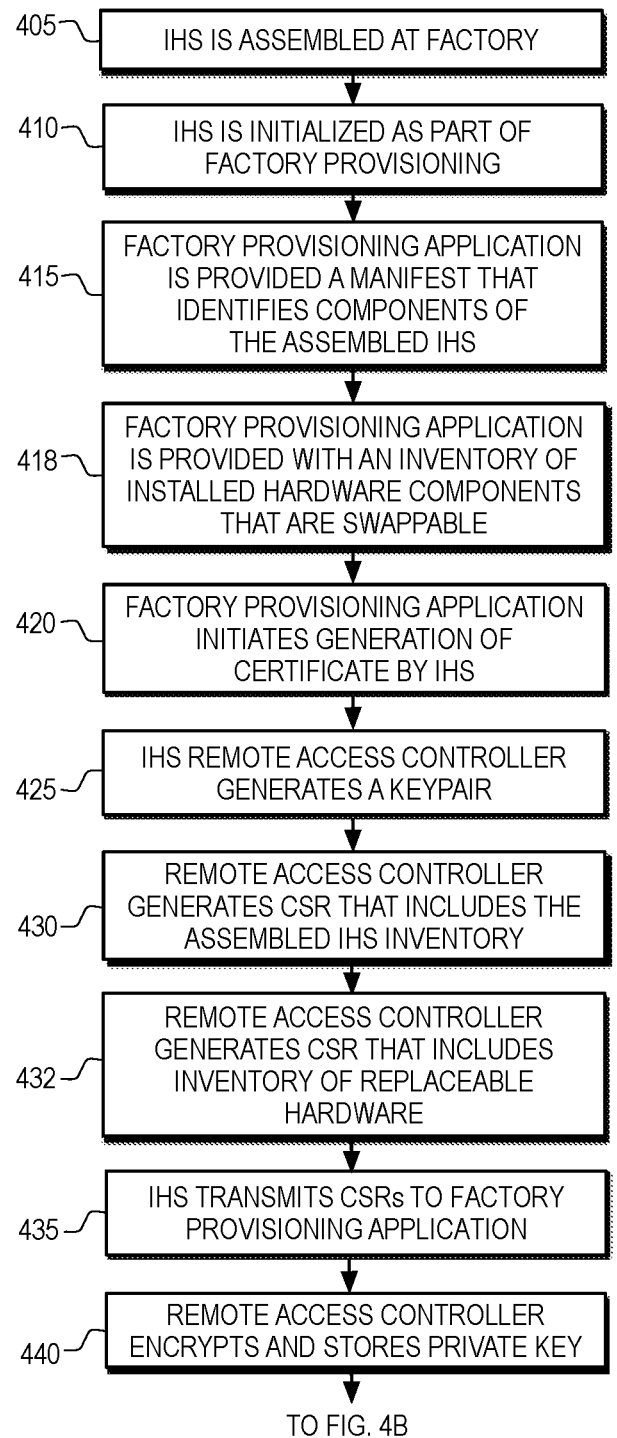
FIG. 4A is a flowchart describing certain steps of a method, according to some embodiments, for assembly and provisioning of an IHS in a manner that supports secure swapping of replaceable hardware components of the IHS.
Figure 4B:
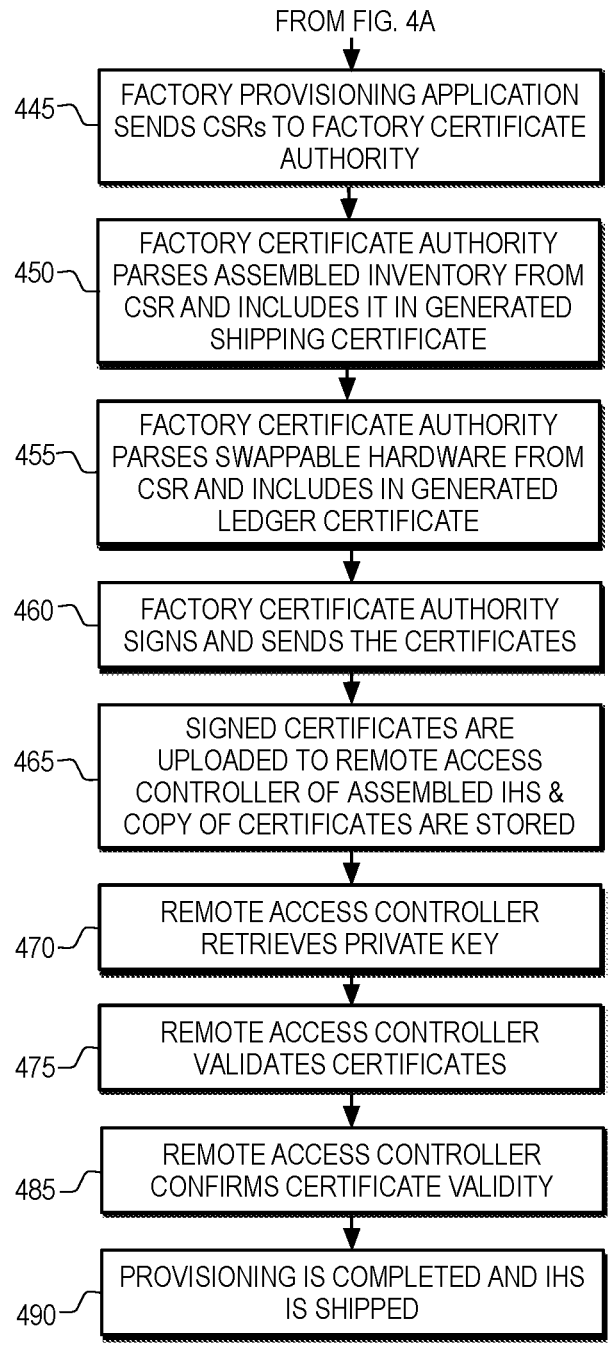
FIG. 4B is a flowchart that is a continuation of FIG. 4A.

FIG. 3 is a swim lane diagram illustrating certain responsibilities of components of a system configured according to certain embodiments for factory provisioning of an IHS in a manner that supports secure swapping of replaceable hardware components of the IHS. FIGS. 4A-B are a flowchart describing certain steps of a method, according to some embodiments, for factory provisioning of an IHS in a manner that supports secure swapping of replaceable hardware components of the IHS. Some embodiments of the method of FIGS. 4A-B may begin, at block 405, with the factory assembly of an IHS, such as the assembly of a server described with regard to FIGS. 1 and 2. In some instances, an IHS may be manufactured using a factory process that includes multiple phases of assembly, validation and provisioning that must be completed before the IHS is supplied to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components that have been requested by a specific customer that has contracted for the assembly and delivery of an IHS.

Once the assembly of an IHS has been completed, the IHS may be subjected to manual and automated inspections that confirm the IHS has been properly assembled and does not include any defects. After confirming an IHS has been assembled without any manufacturing defects, at block 410, factory provisioning of the IHS may be initiated. In some instances, the provisioning of an IHS at the factory may include various stages that may include stages for loading of firmware, configuring hardware components, and installing an operating system and other software. As indicated in FIG. 3, various aspects of this factory provisioning process may be conducted using a factory provisioning application 305, where this factory provisioning application may run on one or more servers and may interface with an IHS that is being provisioned once a requisite amount of firmware and software has been installed to the IHS.

As described, a manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. In some embodiments, this manifest may exclude replaceable hardware components of the IHS, such as replaceable storage drives 240a-n, memory modules 210a-n, network controllers 225, etc. At block 415, a manifest generated during assembly of an IHS is provided to the factory provisioning application 305 that is being used to provision the assembled IHS.

As described in additional detail below, in embodiments, validation of the IHS hardware as factory installed using an inventory certificate may be extended through the use of a ledger certificate that is used in validating the addition or removable of replaceable hardware components of the IHS. In some embodiments, a manifest of the individual replaceable hardware components that are installed in an IHS may also be generated during assembly of the IHS. Such a manifest may also be a file that includes individual entries for some or all of the replaceable hardware components factory installed to an IHS, where each entry may specify various characteristics of the replaceable component, such as model numbers and installation locations, and may also specify any unique identifiers associated with the replaceable component, such as a MAC address or a serial number. In some embodiments, the manifest may specify entries for replaceable hardware components that are supported by the IHS, but that have not been factory installed in the IHS. For instance, such a manifest may specify an entry for an additional network controller 225 (e.g., an additional PCIe controller) or storage drive 240a-n that can be installed in the IHS, but is not a factory installed hardware component. Accordingly, in some embodiments, the entry for a replaceable hardware component in the ledger certificate specifies an installation status for components that have been authorized for installation in the IHS.

At block 418, the manifest of replaceable hardware components is provided to the factory provisioning application 305 that is being used to provision the assembled IHS. Based on this manifest of factory installed hardware and the manifest of replaceable hardware, at block 420, the factory provisioning application 305 may also initiate the generation of an inventory certificate that may be used to validate that the detected hardware components of the IHS are the same hardware components that were installed during the factory assembly of the IHS, and may also initiate generation of a ledger certificate that may be used to validate modifications that add or remove any of the replaceable hardware components of IHS 200.

As described with regard to FIGS. 1 and 2, an IHS may include a remote access controller that provides capabilities for remote management of an IHS, where these remote management capabilities may include sideband management of various hardware components of an IHS. As indicated in FIG. 3, the generation of an inventory certificate and ledger certificate for a newly assembled IHS, at 325, may be initiated via a request from the factory provisioning application 305 to the remote access controller 310 of the IHS. As described with regard to FIG. 2, a remote access controller of an IHS may include cryptographic capabilities that operate within the root of trust of the IHS and that include the ability to generate cryptographic keypairs. Utilizing such cryptographic capabilities, at block 425, the remote access controller 310 initiates the generation of an inventory certificate and ledger certificate by generating a cryptographic key pair for use in validating the authenticity of inventory information that is included in an inventory certificate, and of the inventory and modification information for replaceable hardware components of the IHS that are included in the ledger certificate.

At block 430 and at 330, the remote access controller 310 generates a certificate signing request (CSR) for a digital identity certificate, where the request specifies the public key of the key pair generated by the remote access controller and also specifies the factory installed hardware inventory from the manifest that was generated during assembly of the IHS, where this manifest may exclude replaceable hardware components of the IHS. The factory installed hardware inventory information included in the CSR may be signed by the remote access controller using the private key from the generated keypair.

At block 432 and at 330, the remote access controller 310 generates an additional certificate signing request (CSR) for an additional digital identity certificate, where the request may specify the same public key of the key pair used in the generation of the prior CSR and that is to be endorsed by the inventory certificate of the IHS. In some embodiments, the cryptographic capabilities of the remote access controller 310 will be used to generate an additional keypair for the ledger certificate, which will be used to endorse the public key of this additional keypair. The replaceable hardware inventory information included in this second CSR may then be signed by the remote access controller using the private key from the keypair that is selected. This second CSR includes an inventory of the replaceable hardware components of the IHS. As described above, this inventory may specify all factory-installed replaceable hardware components of the IHS and may also specify any authorized replaceable hardware components that are not being factory installed.

At block 435 and at 335, the CSRs for the requested inventory certificate and ledger certificate are transmitted to the factory provisioning application 305 by the remote access controller 310. At block 440, the remote access controller safeguards the private key(s) from the generated key pair(s). In some embodiments, the remote access controller may encrypt the private key(s) using the hardware root key (HRK) of the IHS and may store the encrypted key(s) to a protected memory, such as the replay protected memory block that is described with regard to FIG. 2.

Upon receiving the certificate signing requests from the remote access controller 310, at block 445 and at 340, the factory provisioning application 305 submits the CSRs for signing by a factory certificate authority 315. In some embodiments, the factory provisioning application 305 specifies a factory key to be used by the factory certificate authority 315 in signing the inventory certificate and may specify a different key to be used in signing the ledger certificate. For instance, the factory provisioning application may include the name of a trusted certificate associated with a factory key as an attribute of the inventory certificate CSR that is transmitted to the factory certificate authority 315 and may include a different trusted certificate with a customer key as an attribute of the ledger certificate CSR.

Upon receipt of the CSR for the inventory certificate, at block 450, the factory certificate authority parses from the CSR: the hardware inventory information, the public key generated by the remote access controller and the information specifying the requested signing key. Based on the information parsed from the CSR, the factory certificate authority generates a digital identity certificate, referred to herein as an inventory certificate, that is associated with the public key provided by the remote access controller and that specifies the factory installed hardware inventory of the IHS.

Upon receipt of the CSR for the ledger certificate, at block 455, the factory certificate authority parses from the CSR: the inventory of replaceable hardware components, the public key generated and selected for use by the remote access controller, and the information specifying the requested signing key, whether the same or different as the requested signing key for the inventory certificate. Based on the information parsed from the CSR, the factory certificate authority generates a digital identity certificate, referred to herein as an ledger certificate, that is associated with the public key provided by the remote access controller in the CSR and that specifies the replaceable hardware components of the IHS.

As indicated in FIG. 3, at 345, the factory certificate authority 315 submits the generated inventory certificate and ledger certificate for signing by a hardware security module 320 that may be a dedicated hardware component of a factory provisioning server that safeguards cryptographic keys and implements cryptographic functions utilized in the factory provisioning process. In some embodiments, the factory certificate authority 315 may also specify a certificate name associated with a signing key that is maintained by the hardware security module 320. At 350, the hardware security module 320 utilizes the private key associated with the specified certificate in order to digitally sign the submitted inventory certificate, which includes the inventory of the factory installed hardware components of the IHS, and to digitally sign the submitted ledger certificate, which includes the inventory of replaceable hardware components of the IHS. The signed certificates are then returned to the factory certificate authority 315 by the hardware security module 320.

Once the certificates have been signed, at block 460 and at 355, the signed certificates are transmitted from the factory certificate authority 315 to the factory provisioning application 305. As indicated in FIG. 3 at 357, the factory provisioning application 305 may store a copy of the signed certificates. In some instances, the copies may be saved to a data store utilized in providing ongoing support of the IHS once it has been shipped and has been deployed by a customer.

At block 465 and at 360, the signed inventory certificate and the signed ledger certificate are then loaded to the assembled IHS. As indicated in FIG. 3, in some embodiments, the signed certificates may be uploaded to a remote access controller 310 of the assembled IHS, such that the signed inventory certificate and the signed ledger certificate may be stored to a nonvolatile memory or other persistent storage that is accessible by the remote access controller 310 independent from the operating system of the IHS. In other embodiments, the signed certificates may be uploaded without reliance on the remote access controller to another non-volatile memory of the IHS.

Some embodiments may continue, at 365, with the validation of the signed certificates by the remote access controller 310. Using the private key from the generated keypair used in generating the CSR for each certificate, at block 470, the remote access controller decrypts the signatures included by the remote access controller in the CSRs and confirms that the inventory information included in the signed certificates matches the inventory information that was submitted in the certificate signing request, thus validating the integrity of the generation of the signed certificates. At block 472, the remote access controller confirms that the signed certificates are valid and, at 370, the remote access controller 310 confirms the validity of the certificates with a notification to the factory provisioning application 305. With the generation and validation of the inventory certificate and ledger certificate completed, additional factory provisioning of the assembled IHS may be completed and, at block 490, the assembled IHS may be shipped from the factory to the designated administrator.

Upon delivery of the IHS, embodiments provide a customer with the capability of validating that the delivered IHS includes only hardware components that were installed at the factory during manufacture of the IHS. Embodiments thus support an initial validation of the secure assembly and delivery of an IHS. Such validations may be repeated each time an IHS is initialized, or in response to detected security conditions.

However, as described, some of the hardware of an IHS are replaceable hardware components that are expected to be removed from the IHS and replaced, or re-installed at a later time. Embodiments also provide a customer with a capability of validating the replacement of such replaceable hardware components of an IHS, where such validations may operate separately than the validations utilized in the validation of permanent hardware components of an IHS, which are specified in the factory-provisioned inventory certificate of the IHS. In embodiments, once an IHS is received, and it has been validated to have been received with only factory-installed hardware specified in the factory-provisioned inventory certificate, then the ledger certificate may be enabled and used in validating the addition and removal of replaceable hardware components from the IHS.

Figure 5:
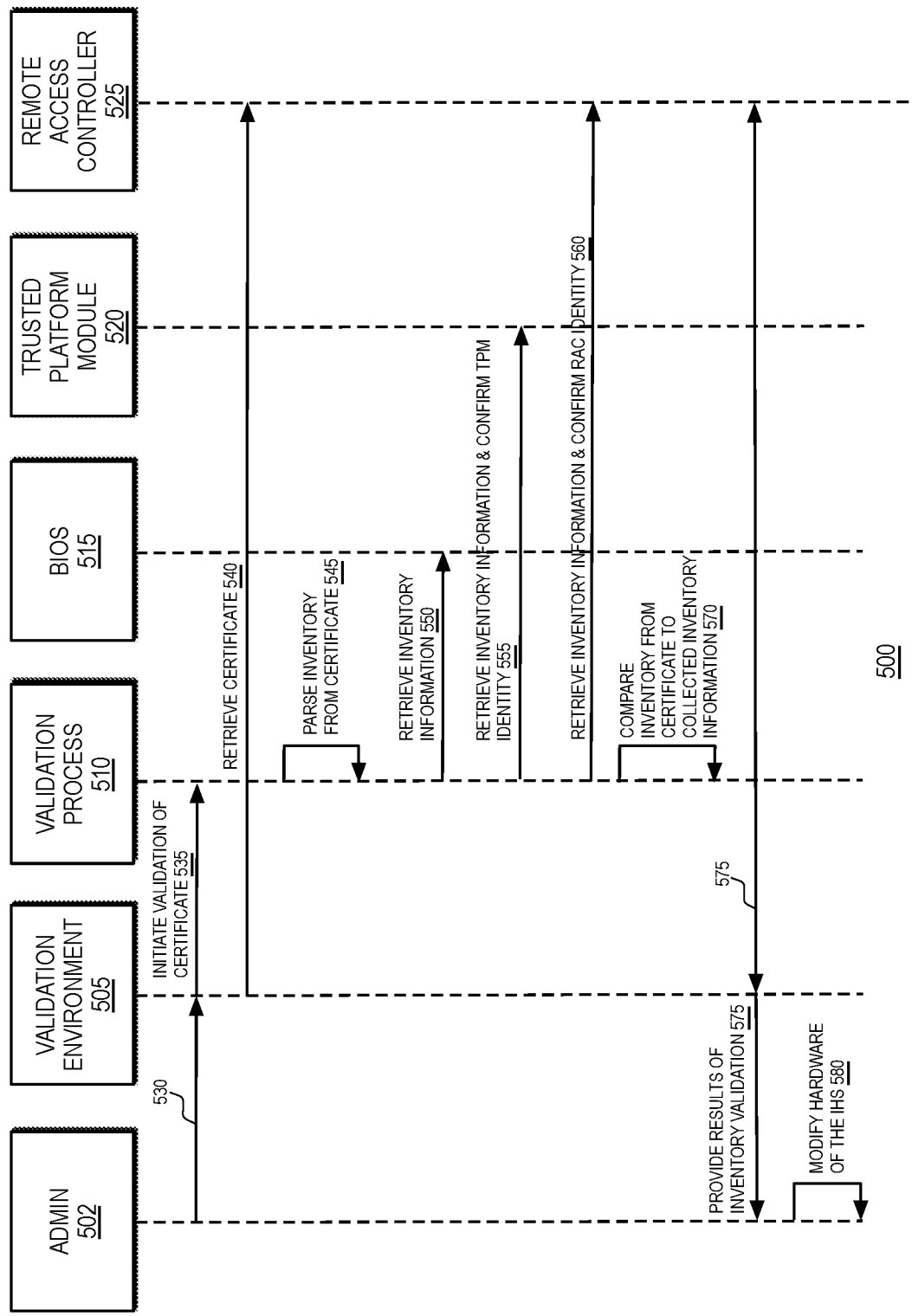
FIG. 5 is a swim lane diagram illustrating certain responsibilities of components of a system configured according to certain embodiments for validation of hardware components an IHS.

FIG. 5 is a swim lane diagram illustrating certain responsibilities of components of an IHS configured according to certain embodiments for use of an inventory certificate in the validation of the hardware components of the IHS. FIG. 6 is a flowchart describing certain steps of a method, according to some embodiments, for use of an inventory certificate in the validation of the hardware components of the IHS and for validation of discrepancies identified in the replaceable hardware components an IHS. Embodiments may begin with the delivery of an IHS that has been assembled and provisioned according to the procedures set forth above. In particular, the delivered IHS has been provisioned at the factory to include a signed inventory certificate that specifies the factory installed hardware components of the IHS and a signed ledger certificate that specifies replaceable hardware components of the IHS.

Upon receiving an IHS configured in this manner, the IHS may be unpacked, assembled and initialized by an administrator 502. In some instances, an IHS may be ready for immediate deployment by a customer. In other instances, an IHS may require further provisioning by customer before it is deployed, such as for operation within a particular data center. As such, in various instances, an IHS may be unpacked, assembled and initialized in order to deploy the IHS or to prepare it for further provisioning.

As described, after this initial provisioning, an administrator 502 may modify hardware of the IHS, such as adding or removing replaceable hardware components of the IHS. Embodiments support such capabilities through the use of a ledger certificate that is used in the validation of all replaceable hardware components of an IHS. However, in some embodiments, use of a ledger certificate in this manner is not supported until the detected hardware of the IHS is validated as being the factory-installed hardware, with no additional hardware present and none missing. In such embodiments, only after this initial validation has been completed is the ledger certificate of the IHS enabled. As such, embodiments may continue with this initial validation of the detected hardware of the IHS as being factory-installed.

At block 605, the IHS has been powered and validation process is initialized. In some instances, the validation process may be initialized as part of the initial provisioning of an IHS by a customer. In other instances, the validation process may be initialized, at 530, by an administrator as part of an onboarding procedure for configuring modifications to the hardware of the IHS. In some embodiments, the validation process may run within a pre-boot environment, such as a PXE (Preboot execution Environment) operating environment. In some embodiments, a PXE operating environment in which a validation process runs may be retrieved from a network location and may thus be executed using the processing and memory capabilities of the IHS. In some embodiments, a PXE operating environment may be retrieved using secure protocols, such as HTTPS, in order to assure the integrity of the operating environment instructions that are utilized. In some embodiments, a pre-boot operating environment in which the validation process runs may include an operating environment that is executed by the remote access controller of the IHS based on validated firmware instructions. In these embodiments that utilize a pre-boot operating environment, the validation of the detected hardware components of the IHS is conducted prior to booting of the operating system of the IHS.

In some embodiments, the validation process may run as part of a diagnostic mode that is supported by an IHS. For instance, an IHS may support a diagnostic mode that may be initiated by a user or may be initiated automatically in response to detecting various conditions, where the diagnostic mode may support various diagnostic tools, including the described hardware validation procedures. In some embodiments, the diagnostic mode may involve re-booting the IHS to a diagnostic environment, while other embodiments may support diagnostic mode operations that run within the operating system of the IHS. Accordingly, some embodiments may support the described hardware validation procedures as a feature available within the operating system of the IHS. In such embodiments, the operating system may be configured to periodically conduct the described hardware validation procedures, such as on a daily or weekly basis. The operating system may likewise be configured to conduct the hardware validation procedures in response to a detected security notification, such as a notification that a process is attempting to access a protected resource. In some embodiments, the described validation procedures may be implemented remotely, such as via the described HTTPS protocols, where the remote validation procedures may rely both on information retrieved from the IHS via HTTPS and on remote information, such as information maintained by the manufacturer of the IHS or by an entity supporting the administration of the IHS.

As indicated at 535 of FIG. 5, an inventory certificate validation process 510 is initiated within a validation environment 505 that may include a pre-boot environment, a diagnostic environment or other environment supporting the validation process. In some embodiments, the inventory certificate validation process 510 operates based on validated instructions, such as based on instructions that, when used to calculate a hash value, are confirmed to correspond to a value stored in an immutable memory of the IHS during its factory provisioning. In this manner, the inventory certificate validation process 510 may be added to the root of trust of the IHS. At block 610 and as indicated at 540, the inventory certificate validation process 510 retrieves the signed inventory certificate from the remote access controller 525, or from a persistent memory of the IHS. As described above, the factory provisioning process may include uploading a signed original inventory certificate to the remote access controller or to a persistent memory of the IHS. At block 615 and at 545, the inventory certificate validation process 510 parses the hardware inventory information from the signed inventory certificate. Using the public key provided in the signed inventory certificate, the inventory validation process 510 may confirm the integrity of the inventory information that is included in the signed inventory certificate.

In some scenarios, the inventory certificate validation process 510 may commence by collecting an inventory of the detected hardware components of the IHS. In some instances, this collection of inventory information may be initiated earlier by the inventory certificate validation process, such as during initialization of the IHS. At block 620 and as indicated at 550, the inventory certificate validation process 510 may query the BIOS 515 of the IHS for an inventory of hardware components that have been detected by BIOS 515. At block 625 and as indicated at 555, the inventory certificate validation process 510 may retrieve additional hardware inventory information from a Trusted Platform Module (TPM) 520 of the IHS. In some instances, the TPM 520 may identify hardware components that are also identified by BIOS 515. However, in some instances, the TPM 520 may identify certain hardware components, such as secure memory modules, that are not identified by BIOS 515.

As described with regard to FIG. 2, a Trusted Platform Module may serve to establish an initial hardware root of trust in an IHS such that the hardware components within this root of trust operate using validated software instructions. Accordingly, in some embodiments, the inventory certificate validation process 510 may compare identity information for the detected TPM 520 against the TPM identity information that is parsed from the inventory certificate at block 545. In some instances, the detection of any discrepancies between the identity of the TPM specified in the inventory certificate and the identity reported by TPM 520 may result in terminating any further validation procedures.

At block 630, the validation process may confirm the identity of the detected TPM against the identity of the TPM reported in the signed inventory certificate. If the identity of the TPM is successfully validated, validation may continue at block 635. However, if the identity of the TPM is not validated, at block 690, the validation process may signal a core inventory validation failure since any discrepancies between the identity of the factory installed TPM and the TPM that has been detected signals a potential compromise in the root of trusted hardware components of the IHS.

At block 635 and as indicated at 560, the inventory certificate validation process 510 may retrieve additional hardware inventory and thermal information from a remote access controller 525 of the IHS. As with TPM 520, remote access controller 525 may provide redundant identification of some hardware components and may provide exclusive identification of other hardware components, such as internal memories, management controllers or logic units utilized by the remote access controller 525. The validation process may also query the remote access controller 525 for any thermal information that is available for each of the detected hardware components, such as any ASHRAE classifications or ratings reported as applicable for each of these detected hardware components. In some embodiments, the sideband management capabilities of the remote access controller 525, such as described with regard to FIG. 2, may be utilized to query all thermal information reported as being used in the management of the detected hardware components. The validation process may query the remote access controller 525 for any available thermal information, whether for hardware reported by the remote access controller 525, TPM 520 or the BIOS 515.

As with TPM 520, in some embodiments, the inventory certificate validation process 510 may compare identity information for the detected remote access controller 525 against the remote access controller identity information that is parsed from the inventory certificate at block 545. In some instances, the detection of any discrepancies between the identity of the remote access controller specified in inventory certificate and the identity reported by remote access controller 525 may also result in terminating any further validation procedures.

At block 640, the validation process 510 may confirm the identity of the detected remote access controller against the identity of the remote access controller reported in the signed inventory certificate. If the remote access controller is successfully validated, validation may continue at block 645. Otherwise, if the identity of the remote access controller is not validated, at block 690, the inventory certificate validation process may signal a core inventory validation failure. As with the TPM, any discrepancies between the identity of the factory installed remote access controller and the remote access controller detected in the initialized IHS signals a potential compromise of the root of trust of the IHS.

The inventory certificate validation process 510 may retrieve additional inventory and thermal information from any other available data sources, such as directly from the processor of the IHS or from a chassis management controller of a chassis in which the IHS has been installed. Upon completion of the collection of the detected hardware components of the initialized IHS, at block 570, the inventory certificate validation process compares the collected inventory information of the detected components against the inventory information that is parsed from the signed inventory certificate. If the unique identifiers of the detected hardware components of the initialized IHS match the identifiers of the factory installed hardware components from the signed inventory certificate, at block 650 and 575, the inventory validation process 510 signals a successful validation of the detected hardware of the IHS as being factory-installed hardware, including providing notification of the successful validation to the administrator 502.

The customer receiving delivery of the IHS is thus assured that the IHS is operating using only hardware components that were installed at the factory during manufacture of the IHS, with no missing or additional hardware components detected. In some embodiments, the issued notification of the validation of detected hardware as shipped may specify that only hardware that has not been designated as replaceable hardware components has been successfully validated as shipped using the factory-provisioned inventory certificate, with validation of the replaceable hardware components still pending. In such scenarios, the validation of replaceable hardware components may be separate from the validation of permanent hardware components of the IHS, in particular from the validation of hardware components within the root-of-trust of the IHS, such as remote access controller 225, a TPM and/or a processor 205 of the IHS.

As described, in some embodiments, the hardware inventory included in the factory-provisioned inventory certificate may exclude replaceable hardware components. In other embodiments, the hardware inventory included in the factory-provisioned inventory certificate may include replaceable hardware components that were factory-installed. Accordingly, in some scenarios, validation of the detected inventory based on the inventory certificate may validate the authenticity of some or all of the replaceable hardware components that are detected by the IHS. However, in other scenarios, the ledger certificate must be utilized for the validation of replaceable hardware components, since the inventory certificate excludes replaceable hardware components, or has an incomplete inventory of the replaceable hardware components.

In the embodiment illustrated in FIG. 6, the factory-provisioned inventory certificate does specify some or all of the factory-installed replaceable hardware components of the IHS. Accordingly, in scenarios where modifications have been made to the replaceable hardware components of the IHS, validation of the detected hardware using the factory-provisioned inventory certificate will result in the detection of one or more discrepancies. For instance, one or more of the factory-installed replaceable storage drives 240a-n may have been removed from the IHS such that these components are not detected by the validation process 510, despite these storage drives being specified in the factory-provisioned inventory certificate. In scenarios where any discrepancy is identified by the validation process 510, at 655, the hardware components are identified that have caused the validation failure due to the hardware component being missing or due to the hardware component being added, but is not validated and thus is unrecognized.

Once a hardware discrepancy causing a validation failure has been identified, at 660, the validation process 510 retrieves the signed ledger certificate that specifies the installation status of the replaceable hardware components of the IHS. Based on the inventory of replaceable hardware components specified in the ledger certificate, at 665, the validation process 510 determines whether the hardware component(s) causing the discrepancy are identified in the ledger certificate as replaceable hardware components. As described in additional detail below, the ledger certificate may specify the installation status of all replaceable hardware components that have been authorized for installation in the IHS, whether the replaceable hardware component have ever been installed in the IHS or not. Accordingly, using the ledger certificate, the validation process 510 may determine whether the hardware component that has been determined as missing or as unrecognized based on the factory-provisioned inventory certificate is a replaceable hardware component.

Based on the retrieved ledger certificate, the validation process 510 may determine that the discrepancy is due to a replaceable hardware component that has been removed from the IHS, or due to a replaceable hardware component that has been installed or re-installed to the IHS. In each of these scenarios, at 670, the validation process 510 may issue a notification specifying the validation failure due to the movement of replaceable hardware components. As described in additional detail below, this notification may be used in triggering updates to the ledger certificate such that the ledger certificate reflects the current installation status of validated replaceable hardware components that have been authorized for installation in the IHS.

As indicated in FIG. 5, if the hardware detected by the IHS is validated as genuine, embodiments may continue with the administrator 502 modifying the hardware of the IHS, such as the described scenarios in which replaceable hardware components of the IHS may be removed, added or replaced. However, once these hardware modifications are made, the validation procedures of FIGS. 5 and 6 may result in a failure to validate the hardware of the IHS, according to the factory-installed hardware inventory set forth in the inventory certificate and the inventory of replaceable hardware components set forth in the ledger certificate. As described in addition detail below, in order to validate these modifications involving replaceable hardware components, embodiments support updates to the ledger certificate such that the updated ledger certificate can be used to confirm the authenticity of detected modifications involving the replaceable hardware components of the IHS. However, embodiments may disable updates to the ledger certificate until the initial validation of the detected hardware of the IHS as being factory-installed is successfully completed for the first time.

Figure 7:
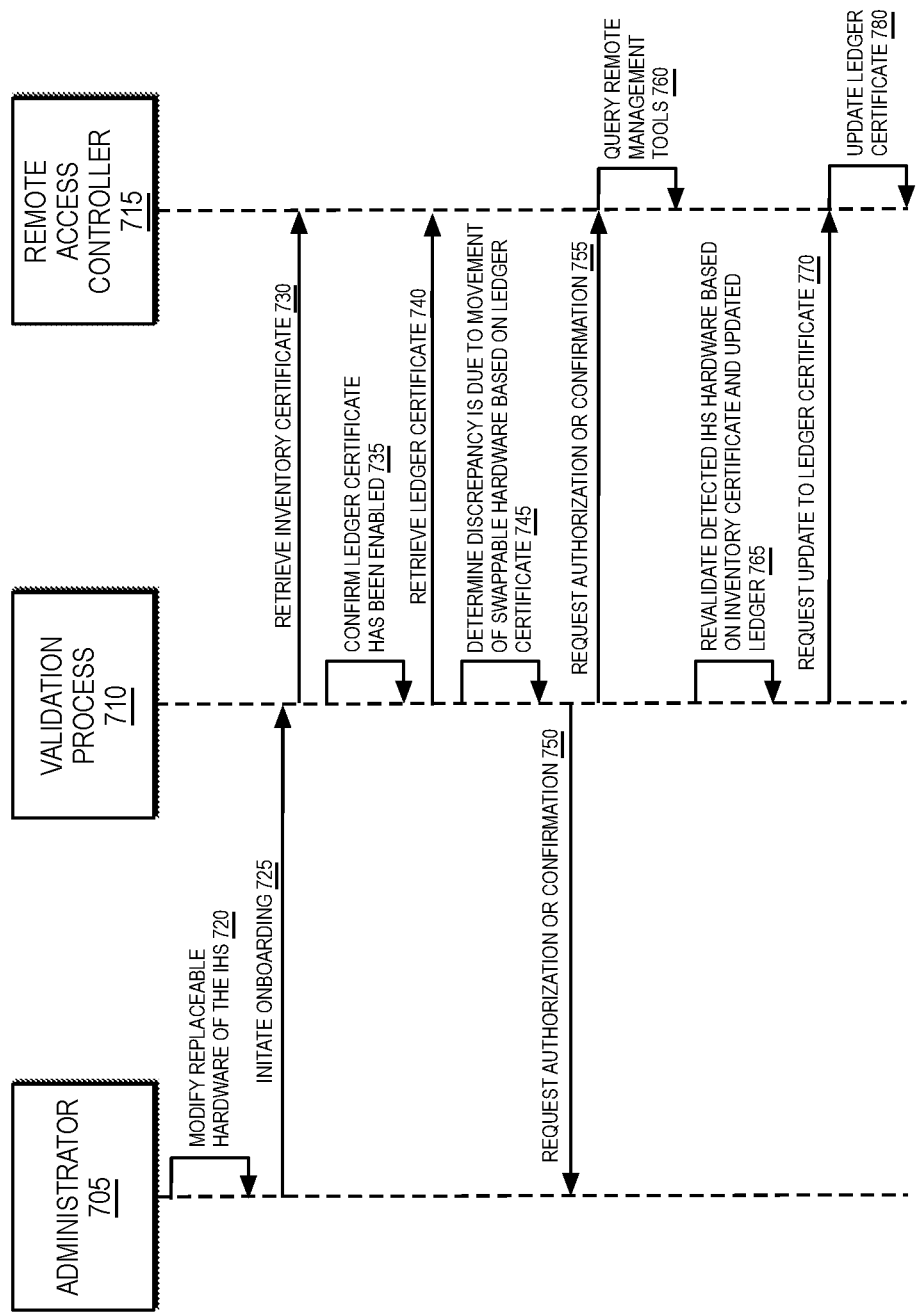
FIG. 7 is a swim lane diagram illustrating certain responsibilities of components of a system configured according to certain embodiments for validation of discrepancies identified in the replaceable hardware components an IHS.

FIG. 7 is a swim lane diagram illustrating certain responsibilities of components of an IHS configured according to certain embodiments for validation of discrepancies identified in the replaceable hardware components an IHS. In FIG. 7, embodiments may begin, at 720, with an administrator 705 making modifications to the hardware of the IHS. As described, these modifications by an administrator 705 may include removal, addition or replacement of one or more replaceable hardware components of the IHS. For instance, an administrator 705 may remove factory-installed replaceable memory modules 210a-n or replaceable storage drives 240a-n from an IHS, where these components may be reinstalled at a later time, or may never be reinstalled in the IHS. In place of the removed component, the administrator 705 may install a different authorized memory module or authorized storage drive in the IHS.

Once the administrator 705 has completed these modifications, the IHS may be reassembled, powered and rebooted. As part of the initialization of the IHS, as indicated in FIG. 7, at 725, the administrator 705 may initiate onboarding of the hardware modifications. In some embodiments, this onboarding may be initiated by the administrator 705 in response to a notification that the procedures of FIGS. 5 and 6A-B resulted in a failure to validate the detected hardware against the inventory certificate and against the ledger certificate, if it has been enabled. In a scenario where a validation failure has been signaled based on a discrepancy from the applicable ledger certificate of an IHS, at block 670 of FIG. 6B, the validation process may notify the administrator of the detected modifications to the replaceable hardware components of the IHS. The notifications in some embodiments may provide the administrator with an option for onboarding these modifications to the replaceable hardware components in a manner that will generate an update to the ledger certificate for ongoing use in validation of these modifications as genuine changes to the replaceable hardware components of the IHS. In some embodiments, an administrator may be able to initiate such onboarding of modifications directly through a boot mode selection, without having to attempt to validate the modified hardware of the IHS.

Figure 6A:
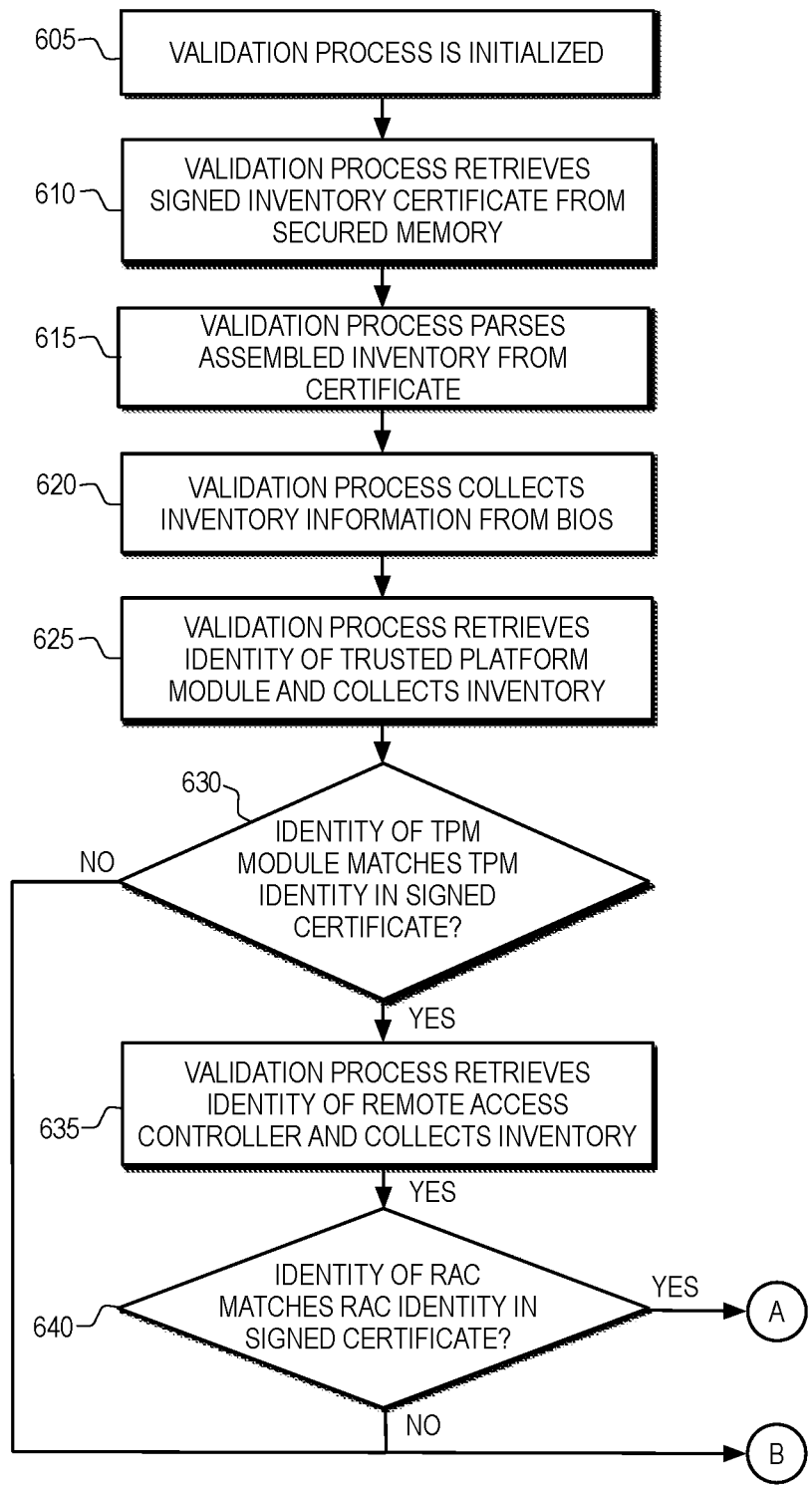
FIG. 6A is a flowchart describing certain steps of a method, according to some embodiments, for validation of discrepancies identified in the replaceable hardware components an IHS.
Figure 6B:
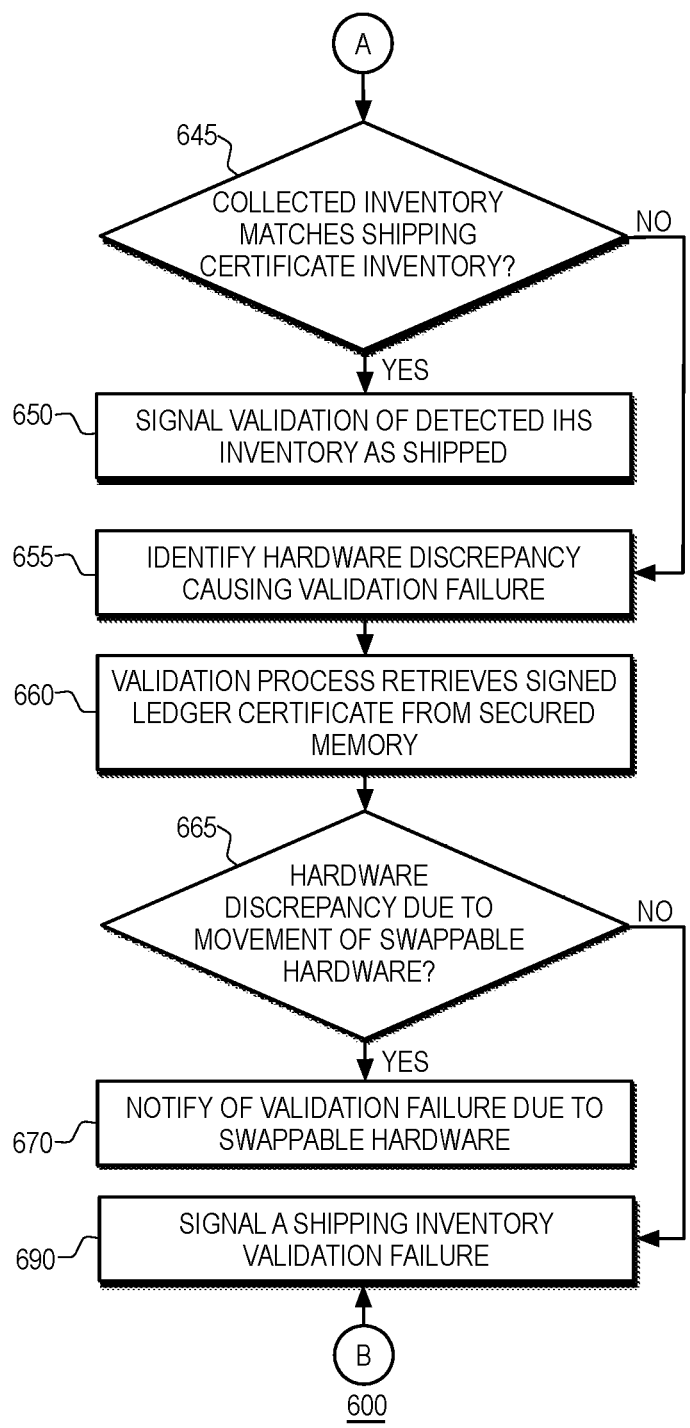
FIG. 6B is a flowchart that is a continuation of FIG. 6A.

Accordingly, the validation process 710 is launched according the procedures of FIGS. 5 and 6A-B. As described above, the factory-provisioned inventory certificate is retrieved, at 730, from the remote access controller 715. In some embodiments, the detected hardware of the IHS must be validated as factory-installed in order for the ledger certificate to be enabled for use in validating modifications to the replaceable hardware components of an IHS. In this manner, modifications to the replaceable hardware components of an IHS are supported, but only after establishing that the IHS has been received and initialized using only the factory-installed hardware.

Accordingly, 735, the validation process 710 confirms that the ledger certificate has been enabled based on a prior validation of the detected hardware of an IHS as the factory-installed hardware. In some embodiments, the ledger certificate may be factory-provisioned to the remote access controller 715 in a non-enabled state. For instance, the ledger certificate may be stored to a secured non-volatile memory of the remote access controller 715, with the remote access controller configured to reject all requests for the ledger certificate until it receives confirmation that the IHS has been validated to have been received and initialized using only the hardware specified in the factory-provisioned inventory certificate. In some embodiments, the validation process 710 may query the remote access controller 715 for the status of the ledger certificate with regard to being enabled.

If the initial validation has been completed and the ledger certificate has been enabled, at 740, the validation process 710 retrieves the ledger certificate from the remote access controller 715 in the same manner as the retrieval of the inventory certificate. In some instances, the validation process 710 may use the inventory certificate and the ledger certificate, as described with regard to FIGS. 5 and 6A-B, to generate an enumeration of the hardware validation discrepancies that result from the modifications to the replaceable hardware components that were made by the administrator 705.

Using the retrieved ledger certificate, at 745, the validation process 710 identifies the entry, or entries, in the ledger certificate that correspond to the replaceable hardware component that is the source of a validation discrepancy. As described, the ledger certificate may be factory-provisioned to specify all factory-installed replaceable hardware components of an IHS, as well as including entries for non-installed, but authorized replaceable hardware components. For instance, in a scenario where the validation process 710 identifies a validation failure due to a missing replaceable storage drive that was not detected, the validation process identifies the entry in the ledger certificate that corresponds to this missing storage drive. Even though the storage drive has not been detected by the validation process 710, this status is not yet reflected in the ledger certificate entry for the storage drive, which indicates that the storage drive is currently installed.

With the ledger certificate entry for the missing hardware component identified, at 750, the validation process 710 may prompt the administrator 705 for manual authorization for the removal of the hardware component. Based on information included in the ledger certificate entry for the storage drive, the prompt may specify the unique identifier of the storage drive, the model or other human-friendly identifier for the storage drive, the location (e.g., bay) in which the storage drive was previously installed, etc. The prompt may provide the administrator with an option for confirming that this particular storage drive has been removed from the IHS.

In some instances, an administrator 705 may not be available for manually confirming the removal of the replaceable hardware component. As indicated in FIG. 7, the validation process 710 may interface with the remote access controller 715 in requesting authorization for the detected removal of the replaceable hardware component. In order to obtain the requested authorization, at 760, the remote access controller 715 may query various remote management tools or interfaces. As described, the remote access controller 715 may include networking capabilities that are separate from those of the IHS such that the remote access controller may communicate with remote management tools while the CPU and other main systems of the IHS are powered off during a pre-boot validation phase.

Using these networking capabilities of the remote access controller 715, management interfaces may be used to prompt any available data center administrators for authorization for the removal of the replaceable hardware component. As described, multiple different administrators may interoperate in managing operations of a datacenter such that embodiments may prompt administrators via various management tools being used in the datacenter. In light of the relatively low risk posed by the addition and remove of replaceable hardware components that are outside of the root of trusted hardware components of an IHS, some embodiments may support validation of modifications involving replaceable hardware components by remote administrators even if they are not physically present to confirm the removal. In some embodiments, AI systems used in the management of a data center may respond to prompts from the validation process 710 in providing authorization for the removal, where the AI system may base its authorization for removal of the component on factors such as the component being a commodity storage drive that poses a minimal security risk, and such as based on the history of the installation history of the component, as reflected in its entry in the ledger certificate.

In some embodiments, the remote access controller 715 may query automated tools for authorization for the removal of the replaceable hardware component. For instance, automated inventory management systems may be queried regarding the status of the replaceable hardware component that was not detected by the IHS. If the inventory management systems report that the component has been retired, this confirmation of the status of the component may be sufficient in some embodiments to provide authorization for its removal. In another scenario, the inventory management systems may report that the component has been installed in a different IHS, thus providing confirmation that is sufficient for authorizing the removal. In some embodiments, the validation process 710 may be configured to forgo manual confirmation by an administrator 705 and instead initially attempt to obtain an automated authorization from the available remote management tools.

In another scenario, the validation process 710 identifies a validation failure due to an unrecognized hardware component, such as due to the addition, at 720, of a replaceable storage drive by the administrator 705. As an unrecognized component, the storage drive is not present in the inventory of the factory-provisioned inventory certificate, nor is the storage drive indicated as an installed replaceable hardware component in the ledger certificate. As in scenarios where a replaceable hardware component is missing, the validation process 710 identifies any entry in the ledger certificate that corresponds to this unrecognized storage drive.

Even though this storage drive has detected by the validation process 710 is unrecognized, this storage drive may nonetheless have an entry in the ledger certificate. As described above, a ledger certificate may include entries for each of the replaceable hardware components that are factory-installed in an IHS, and the ledger certificate may also include entries for replaceable hardware components that are authorized for installation in the IHS, but are not factory installed. For instance, in the factory-provisioning of an IHS, a factory provisioning application may populate the ledger certificate of the IHS with entries for replaceable hardware components that are authorized for installation in the IHS. For instance, an IHS may be purchased along with replaceable hardware components that are not factory installed, but instead shipped to the customer separately. In such scenarios, the identities of these purchased replaceable hardware components may be known at the time of the factory-provisioning of the IHS such that entries may be generated for each of these components in the ledger certificate.

In another scenario, the customer may have previously purchased replaceable hardware components that are compatible for use with the IHS that is being factory-provisioned. Based on instructions provided by the customer, the factory-provisioning application may populate the ledger certificate of the IHS with entries for some or all of the replaceable hardware components that have been previously purchased by the customer and that are compatible for installation in the IHS. In another scenario, the customer may provide a listing that identifies the replaceable hardware components that are authorized for use in the IHS, such as a pool of compatible replaceable storage drives that are used in the customer's data center where the IHS will be deployed. Using such a listing provided by a customer, the factory-provisioning application may populate the ledger certificate of the IHS with entries for each of the replaceable hardware components specified by the customer.

In embodiments, the entry for each replaceable hardware component in the ledger certificate indicates an installation status for that hardware component. For instance, the installation status may indicate that the replaceable hardware component is presently installed, and may further indicate that it is a factory installed component, and/or may indicate the time and date of the component's installation. In other instances, the installation status provided in the ledger certificate may indicate that the replaceable hardware component is presently not installed, and may further indicate the time and data of the component's removal, or whether the component has never been installed in the IHS.

As such, the ledger certificate may include an entry for a replaceable hardware component that cannot be validated and is thus categorized as unrecognized. At 745, the validation process 710 determines whether the unrecognized hardware component corresponds to any of the entries of the ledger certificate that are authorized, but not presently installed, replaceable hardware components. For instance, identifiers collected from the detected, but unrecognized, hardware component are compared to the descriptors provided for each of the possible entries in the ledger certificate that may correspond to this unrecognized hardware component. Through these comparisons, embodiments may identify one or more entries in the ledger certificate that may be used to authorize its addition to the IHS, after which the ledger certificate may be updated to reflect the updated component installation status for use in future validations of the added component.

With a ledger certificate entry for the unrecognized hardware component identified, at 750, the validation process 710 may prompt the administrator 705 for manual authorization for the addition of the unrecognized component. Based on information included in the ledger certificate entry for the replaceable hardware component that matches the description of the unrecognized component, the prompt may specify the unique identifier of the unrecognized component, the model or other human-friendly identifier for the unrecognized component, the location (e.g., bay) in which the unrecognized component was detect, etc. The prompt may thus provide the administrator with an option for confirming that the unrecognized component is the replaceable hardware component that corresponds to this entry in the ledger certificate.

In some instances, an administrator 705 may not be available for manually confirming the addition of an unrecognized hardware component. As for missing hardware, the validation process 710 may interface with the remote access controller 715 in requesting authorization for the detected addition of the unrecognized hardware component, and in particular authorization for changing the installation status of that component in the ledger certificate. As for missing hardware, at 760, the remote access controller 715 may query various remote management tools or interfaces for such authorization.

The remote access controller 715 may utilize any available management interfaces to prompt any available data center administrator for authorization for the addition of the unrecognized hardware component. As with missing replaceable hardware components, the addition of a replaceable hardware component that is outside the root of trusted hardware components of an IHS presents relatively low risk, which is lessened further in these scenarios where the unrecognized component has been previously authorized for use by the IHS and has an entry in the ledger certificate. In some embodiments, AI systems used in the management of a data center may evaluate such ledger certificate characteristics in responding to prompts from the validation process 710 for authorization for the addition of unrecognized replaceable hardware components.

As with missing hardware, the remote access controller 715 may query automated tools for authorization the addition of the unrecognized hardware component. For instance, automated inventory management systems may be queried to further identify the unrecognized hardware component that was detected by the IHS. If the inventory management systems reports that the unrecognized component has been recently sold to the customer that purchased the IHS, this confirmation of the authenticity of the unrecognized hardware component may be sufficient in some embodiments to provide authorization for its addition, and for updating the ledger certificate. In another scenario, the inventory management system may report that the unrecognized component has been removed from a different IHS, thus supporting an automated authorization for its addition in the IHS.

Once authorization has been obtained for addition of an unrecognized hardware component or for removal of a replaceable hardware component, at 765, the validation process 710 confirms that an update to the ledger certificate will result in the detected hardware of the IHS being properly validated. As such, in some embodiments, the validation process 710 may repeat some or all of the validations of FIGS. 5 and 6A-B using the status information that would be used to update the ledger certificate, such as updates specifying that a component has been installed or uninstalled from the IHS.

If these prospective modifications to the ledger certificate would result in successful validation of the detected replaceable hardware components of the IHS, at 770, the validation process 710 requests these updates to the ledger certificate by the remote access controller 715. As described, both the factory-provisioned inventory certificate and the factory-provisioned ledger certificate may be generated using the cryptographic capabilities of the remote access controller 715 of the IHS. As such, the validation process 710 relies on the remote access controller 715 to make updates to the ledger certificate.

As described, the entry in the ledger certificate for each replaceable hardware component may include a status specifying whether an authorized component is installed or not installed in the IHS. Accordingly, part of the updates made, at 780, by the remote access controller 715 to the ledger certificate include updating the installation status of the hardware component, where the status of an entry corresponding to an unrecognized component that is being added is updated to indicate an installed status, and where the status of an entry corresponding to a missing component is updated to indicate an uninstalled status. Each entry may be further updated with a timestamp corresponding to the time of the update to the ledger certificate, and thus approximately corresponding to the time of the modification to the replaceable hardware components.

Upon making an update to the ledger certificate, the remote access controller 715 may generate a digital signature for use in authenticating that particular update. As described above, the remote access controller 715 may generate a private keypair, of which the public key was endorsed by the factory certificate authority as part of including the public key in the ledger certificate generated by the factory certificate authority. In some embodiments, the private key from this keypair may be used to generate a digital signature based on the timestamp and based on a unique identifier of the component that has been added or replaced. This signature may be included in the ledger certificate entry for the component and may be used in subsequent validations of that particular modification. For instance, when validating the a detected replaceable hardware component against the entry for that component in the ledger certificate, the validation process 710 may evaluate the digital signature for the more recent transaction for that entry (e.g., the most recent instance of the component being added or removed) in order to confirm the validity of that transaction. This digital signature may be validated through a query to the remote access controller 715 in order to confirm the signature was created using a keypair controlled by the remote access controller 715.

Once a replaceable hardware component has been included in the ledger certificate as being authorized for installation in an IHS, the entry for that component is not removed from the ledger certificate. Instead, the ledger certificate is updated to reflect the last validated installation status of the replaceable hardware component. In this manner, replaceable hardware components may be drawn from a pool of authorized components and validated as authentic as they are installed in IHSs, such as within a datacenter, and the ledger certificate may be updated for use in validating each addition or removal of one of these authorized components from an IHS. Since these replaceable hardware components are outside of the root of trusted hardware, the modifications may be subjected to less stringent validation requirements. Moreover, in some embodiments, failure to validate these replaceable hardware components may be treated as a warning condition that does not preclude IHS operations, or may be addressed by quarantining the component.

In existing systems, each addition or removal of a hardware component may be validated using a delta certificate that reflects modifications from a prior validated state, such as from the validated state specified in the factory-provisioned inventory certificate. A chain of delta certificates may thus be navigated in order to validate the history of modifications to an IHS. However, for replaceable hardware components that me be regularly added and removed from IHSs, a long chain of delta certificates is generated for validating these modifications. The chain of delta certificates thus grows in size with each modification.

As described, the inventory certificate may be factory-provisioned such that it is stored in a protected memory of the remote access controller 715. In systems that utilize chains of delta certificates, attempts to store the chain of delta certificates along with the inventory certificate consumes this protected memory, thus resulting in additional complexity and overhead by the remote access controller 715 in managing the storage space that is available in this protected memory for use in storing and using a chain of delta certificates. In addition, the complexity of a chain of delta certificates may increase substantially if different branches of the delta certificate chain are generated in response to replaceable hardware components being removed and subsequently re-installed in the IHS. For instance, in a scenario where a delta certificate is generated in response to addition of a component, but the component is subsequently removed such that the IHS is rolled back to a prior validated state, new modifications may result in creation of a new delta certificate that is a peer to the delta certificate that has been rolled back, thus generating a separate branch in the delta certificate chain.

In embodiments, on the other hand, a single ledger certificate is used for validating all modifications to all replaceable hardware components that are authorized for installation in an IHS. Even if the ledger certificate does grow in size as transactions are recorded in the entries of the ledger certificate, this growth in size of the ledger certificate is limited to the addition of new entries, rather than adding an entire delta certificate. Additionally, in existing systems that use delta certificates, evaluation of the validation status of all detected replaceable hardware components may require evaluating the entire chain of delta certificates. In embodiments, on the other hand, a single ledger certificate may be consulted for validating all replaceable hardware components, without having to traverse the full chain of delta certificates. Moreover, the ledger certificate provides a mechanism for quickly identifying all validated replaceable hardware components that are presently installed in the IHS, as well as identifying all validated replaceable hardware components that are authorized for use by the IHS, but are not presently installed in the IHS.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
one or more processors; and
one or more memory devices coupled to the one or more processors, the one or more memory devices configured with computer-readable instructions stored thereon that, upon execution by the one or more processors, cause a validation process of the IHS to perform operations that comprise:
retrieve a factory-provisioned inventory certificate that specifies factory-installed hardware of the IHS;
determine whether the factory-provisioned inventory certificate is valid, based, at least in part, upon a public encryption key provided in the factory-provisioned inventory certificate; and
upon a determination the factory-provisioned inventory certificate is valid:
identify a discrepancy between hardware of the IHS detected by a Basic Input/Output System (BIOS), and the factory-installed hardware specified in the factory-provisioned inventory certificate;
retrieve a factory-provisioned ledger certificate that specifies replaceable hardware supported by the IHS;
determine when the discrepancy is due to movement of the replaceable hardware supported by the IHS; and
upon validation of the movement of the replaceable hardware, update the factory-provisioned ledger certificate to indicate the movement of the replaceable hardware supported by the IHS.

2. The IHS of claim 1, wherein updates to the factory-provisioned ledger certificate are blocked until the factory-provisioned inventory certificate is used to confirm the IHS as received included only the factory-installed hardware.

3. The IHS of claim 2, wherein updates to the factory-provisioned ledger certificate are blocked by a remote access controller of the IHS.

4. The IHS of claim 1, wherein the factory-provisioned inventory certificate is stored to a persistent memory of the IHS when the IHS is factory-provisioned.

5. The IHS of claim 4, wherein the factory-provisioned ledger certificate is also stored to the persistent memory of the IHS when the IHS is factory-provisioned.

6. The IHS of claim 1, wherein the replaceable hardware specified in the factory-provisioned ledger certificate comprises hardware that is not included in a hardware root-of-trust of the IHS.

7. The IHS of claim 6, wherein hardware included in the hardware root-of-trust of the IHS comprises at least one of a processor, remote access controller and TPM (Trusted Platform Module).

8. The IHS of claim 1, wherein validation of a modification specified in the factory-provisioned ledger certificate does not require validation of any prior modifications to the IHS.

9. The IHS of claim 1, wherein updates to the factory-provisioned ledger certificate specify whether a replaceable hardware component of the IHS is installed in the IHS.

10. The IHS of claim 9, wherein the factory-provisioned ledger certificate specifies all replaceable hardware components of the IHS that are installed in the IHS.

11. The IHS of claim 1, wherein updates to the factory-provisioned ledger certificate specify whether a replaceable hardware component of the IHS is not installed in the IHS.

12. The IHS of claim 11, wherein the factory-provisioned ledger certificate specifies a plurality of replaceable hardware components of the IHS that have been authorized for use by the IHS, but are not installed in the IHS.

13. A method for validating replaceable hardware components of an Information Handling System (IHS), the method comprising:
retrieving, by a pre-boot validation process of the IHS, a factory-provisioned inventory certificate that specifies factory-installed hardware of the IHS;
determining whether the factory-provisioned inventory certificate is valid, based, at least in part, upon a public encryption key provided in the factory-provisioned inventory certificate; and
upon determining the factory-provisioned inventory certificate is valid:
identifying a discrepancy between hardware of the IHS detected by a Basic Input/Output System (BIOS), and the factory-installed hardware specified in the factory-provisioned inventory certificate;
retrieving a factory-provisioned ledger certificate that specifies replaceable hardware supported by the IHS;
determining when the discrepancy is due to movement of the replaceable hardware supported by the IHS; and
upon validating the movement of the replaceable hardware, updating the factory-provisioned ledger certificate to indicate the movement of the replaceable hardware supported by the IHS.

14. The method of claim 13, wherein the factory-provisioned inventory certificate is stored to a persistent memory of the IHS during factory-provisioning of the IHS.

15. The method of claim 14, wherein the factory-provisioned ledger certificate is also stored to the persistent memory of the IHS during the factory-provisioning of the IHS.

16. The method of claim 13, wherein the replaceable hardware specified in the factory-provisioned ledger certificate comprises hardware not included in a hardware root-of-trust of the IHS.

17. The method of claim 13, wherein updating the factory-provisioned ledger certificate specifies whether a replaceable hardware component of the IHS is installed in the IHS.

18. The method of claim 13, wherein updating the factory-provisioned ledger certificate specifies whether a replaceable hardware component of the IHS is not installed in the IHS.

19. A computer-readable storage device configured with instructions stored thereon to provide validation of replaceable hardware components of an Information Handling System (IHS), wherein execution of the instructions by one or more processors of the IHS causes a pre-boot validation process of the IHS to perform operations that comprise:
- retrieve a factory-provisioned inventory certificate that specifies factory-installed hardware of the IHS;
- determine whether the factory-provisioned inventory certificate is valid, based, at least in part, upon a public encryption key provided in the factory-provisioned inventory certificate; and
- upon a determination the factory-provisioned inventory certificate is valid:
  - identify a discrepancy between hardware of the IHS detected by a Basic Input/Output System (BIOS), and the factory-installed hardware specified in the factory-provisioned inventory certificate;
  - retrieve a factory-provisioned ledger certificate that specifies replaceable hardware supported by the IHS;
  - determine when the discrepancy is due to movement of the replaceable hardware supported by the IHS; and
  - upon validation of the movement of the replaceable hardware, update the factory-provisioned ledger certificate to indicate the movement of the replaceable hardware supported by the IHS.

20. The computer-readable storage device of claim 19, wherein the factory-provisioned inventory certificate and the factory-provisioned ledger certificate are both stored to a persistent memory of the IHS when the IHS is factory-provisioned.

* * * * *